United States Patent [19]
Girodin

[11] 3,973,394
[45] *Aug. 10, 1976

[54] COMBUSTION ENGINE WITH REDUCED EMISSIONS

[76] Inventor: Mario Girodin, 20 Place de la Madeleine, 75008 Paris, France

[ * ] Notice: The portion of the term of this patent subsequent to Apr. 15, 1992, has been disclaimed.

[22] Filed: Feb. 6, 1975

[21] Appl. No.: 547,558

Related U.S. Application Data

[63] Continuation of Ser. No. 339,834, March 9, 1973, Pat. No. 3,877,220.

[30] Foreign Application Priority Data

Mar. 10, 1973 France .............................. 73.08573

[52] U.S. Cl. ............................................. 60/39.63
[51] Int. Cl.² ......................................... F02G 3/02
[58] Field of Search .......................... 60/39.63, 39.6

[56] References Cited
UNITED STATES PATENTS 3,877,220  4/1975  Girodin .............................. 60/39.63

*Primary Examiner*—Clarence R. Gordon

[57] ABSTRACT

An external combustion engine wherein air compressed in a plurality of cylinders is delivered to a common combustion chamber is disclosed. The hot exhaust gases exiting the combustion chamber of the present invention are returned directly to the cylinders at a pressure which approximates the compressed air delivery pressure. In a preferred embodiment the combustion chamber is divided into two portions and control over the engine output power is achieved either by varying the time of opening of the valves which return the exhaust gases to the cylinders or by means of a variable pressure drop fuel delivery device which operates in combination with a variable delivery fuel pump.

8 Claims, 12 Drawing Figures

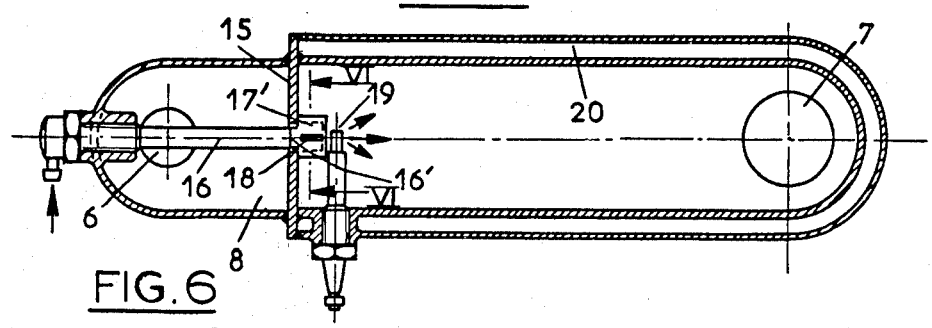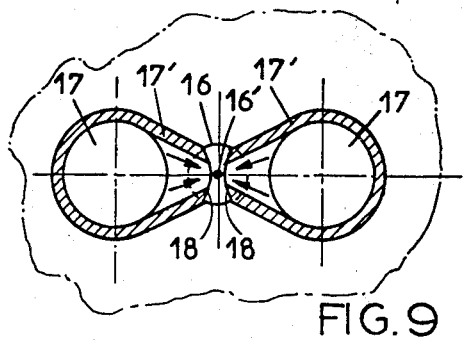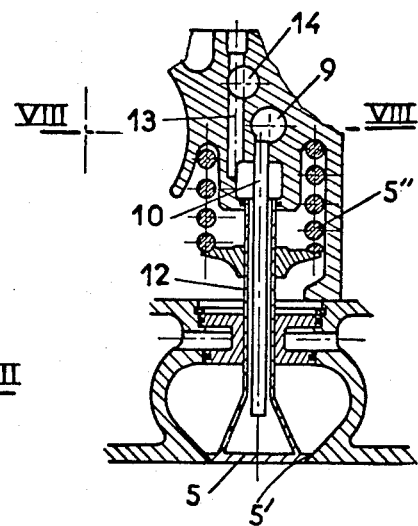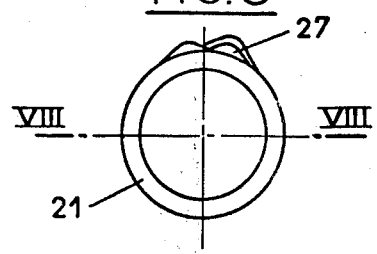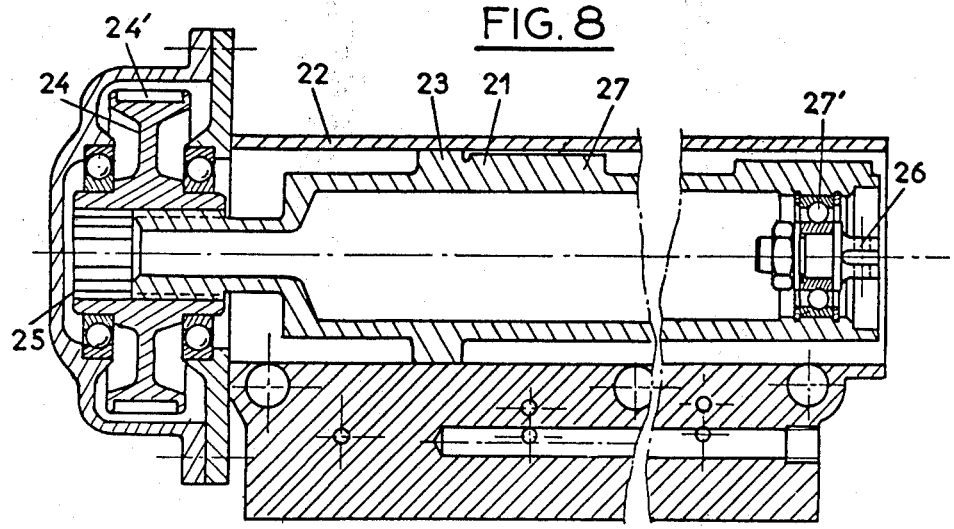

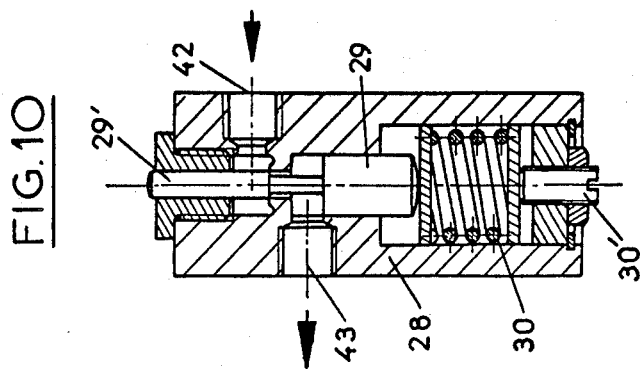
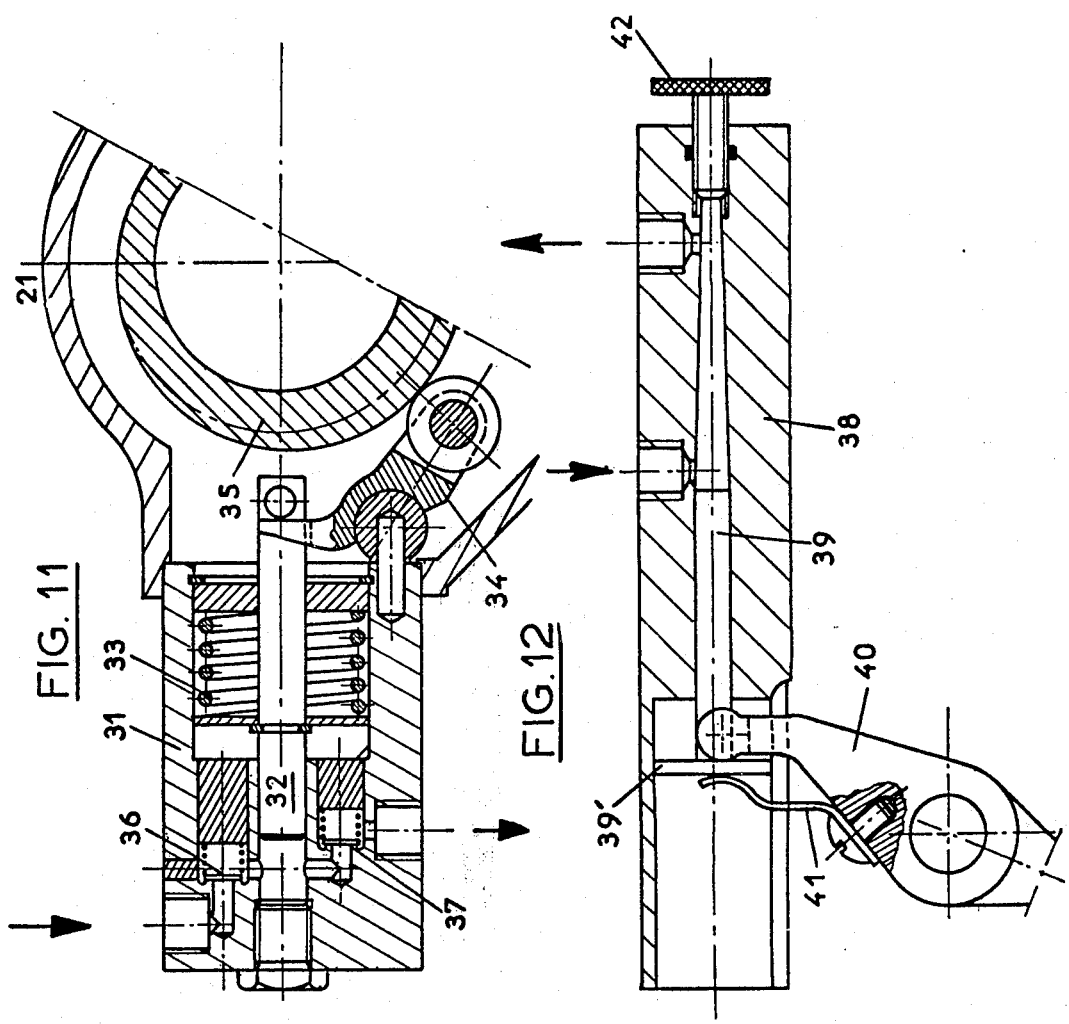

3,973,394

COMBUSTION ENGINE WITH REDUCED EMISSIONS

CROSS-REFERENCE TO RELATED APPLICATIONS

This application is a continuation of U.S. patent application Ser. No. 339,834 filed Mar. 9, 1973, now U.S. Pat. No. 3,877,220. Application Ser. No. 339,834 was entitled to the Mar. 10, 1972 filing date of French Application Ser. No. 72/08573 and the benefits of the French filing date are similarly claimed for this application.

BACKGROUND OF THE INVENTION

1. Field of the Invention

The present invention relates to the reduction of the pollutants carried by the exhaust gases of fuel burning engines. More specifically, this invention is directed to an external combustion type engine. Accordingly, the general objects of the present invention are to provide novel and improved methods and apparatus of such character.

2. Description of the Prior Art

It is, of course, well known that the exhaust gases from "heat" engines of both the internal combustion and "explosion" types are characterized by a composition commensurate with incomplete burning. While theoretical solutions to the problems associated with cleansing the exhaust gases emanating from fuel burning engines have been proposed, apparatus in accordance with such theoretical solutions are believed to be prohibitive from the standpoint of both manufacturing cost and operating expense.

The advantages of external combustion engines; i.e., engines in which combustion takes place in a separate chamber at virtually constant pressure; are well known. Unfortunately, previously proposed engines of the external combustion type have not been applicable to use in the automotive field.

SUMMARY OF THE INVENTION

The present invention overcomes the above briefly discussed and other deficiencies and disadvantages of the prior art by providing a novel external combustion engine particularly well suited for use in automobiles. An engine in accordance with the present invention can be both manufactured and operated at reasonable cost.

The external combustion heat engine of the present invention is characterized by an operational mode wherein, at the end of the compression phase, each cylinder delivers the air compressed therein to a common combustion chamber. The hot gases leaving the combustion chamber are subsequently delivered to the cylinders at a pressure close to the delivery pressure. Thus, disregarding pressure losses occurring in the combustion chamber, an engine in accordance with the present invention operates upon a diesel cycle.

Structurally, each cylinder head of an engine in accordance with the present invention includes a pair of control valves respectively for delivering compressed air to the combustion chamber and for receiving hot gases from the combustion chamber. This arrangement will be employed whether the engine is of the two or four stroke type. Also in accordance with the invention, the hot gas inlet valve associated with each cylinder is cooled by a continuous flow of a suitable coolant; the valve head and its stem being hollow to permit coolant flow.

The combustion chamber, preferably a single such chamber being operatively associated with several cylinders and there possibly being a plurality of combustion chambers, in a preferred embodiment of the invention is characterized by division into two compartments which are in communication with one another through a restriction designed to produce a pressure loss. The volume of the two compartments of the combustion chamber is such that the intermittent arrival of compressed air and the intermittent discharge of hot gases produces only a small variation in pressure relative to the main operating pressure. A continuous fuel-feed jet is positioned in the combustion chamber adjacent to the restriction by which communication between the two compartments is established thereby permitting the utilization of the pressure drop produced by the restriction to effect the mixing of the fuel and air.

Also in accordance with the present invention, engine output power control may be effected by varying the time of opening of the hot gas inlet valves. Control over the time of opening of the inlet valves is accomplished by means of a camshaft associated with each row of cylinders; the camshaft being axially displaceable and carrying cams having profiles of evolute form.

The delivery of fuel to the combustion chamber or chambers of an engine in accordance with the present invention is controlled by a regulator so that fuel flow increases when chamber pressure descreases and decreases when combustion chamber pressure increases. This mode of fuel control permits the variation of engine power by means of the axially displaceable camshaft, as described above, since the feed pressure of the cycle in the cylinders is maintained substantially constant.

In accordance with a second embodiment of the invention, power control is achieved more simply, albeit at the expense of a slight reduction in efficiency, by a pressure drop producing device arranged between the fuel injection nozzle in the combustion chamber and a variable fuel pump. The pressure drop producing device, which may be a needle valve, will not permit fuel delivery beyond a given pressure; the maximum pump pressure corresponding to the maximum cycle pressure in the cylinders and the opening time of the valves being constant.

BRIEF DESCRIPTION OF THE DRAWING

The present invention may be better understood and its numerous objects and advantages will become apparent to those skilled in the art by reference to the accompanying drawings which depict a two-stroke engine and in which:

FIG. 5 is an axial section view through a combustion chamber of the embodiment of FIG. 1;

FIG. 6 is an enlarged partial section view, taken along line VI—VI, of the combustion chamber of FIG. 5;

FIG. 7 is an enlarged fragmentary view of the valve of FIG. 2;

FIG. 8 is a cross-sectional view through the axis of a camshaft, line VIII—VIII of FIG. 9, taken in a plane parallel to the cylinder head joint plane, FIG. 8 showing the apparatus which controls the camshaft axial position;

FIG. 9 is a sectional view through the camshaft of the disclosed embodiment of the invention;

FIG. 10 is a cross-sectional view of a constant-pressure fuel-flow regulator in accordance with the invention;

FIG. 11 is an axial section through a fuel feed pump which may be employed with the present invention; and FIG. 12 is an axial section through a needle-valve fuel-flow control device which may be employed in a second embodiment of the present invention.

DESCRIPTION OF THE PREFERRED EMBODIMENT

Figure 1:
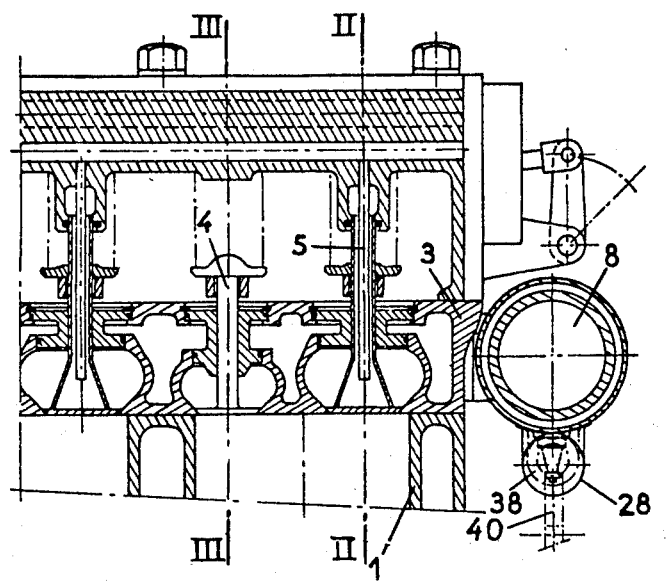
FIG. 1 is a partial side elevation cross-sectional view of an engine in accordance with a first embodiment of the present invention.
Figure 2:
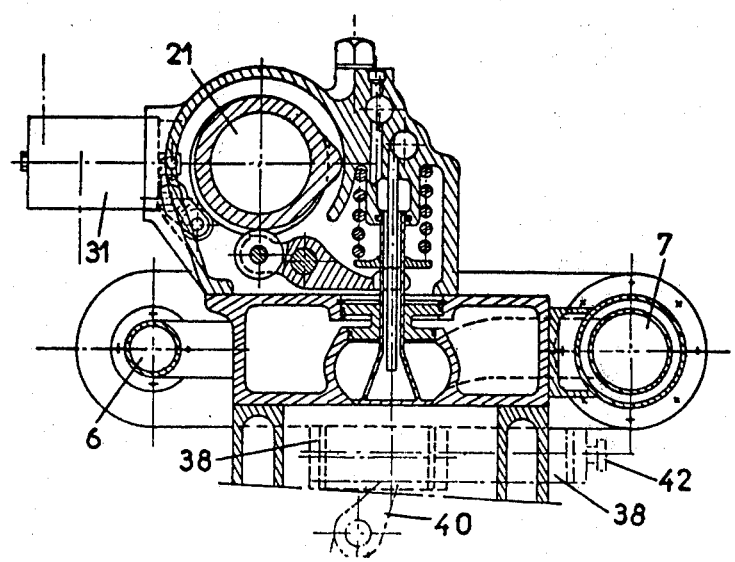
FIG. 2 is a cross-sectional view of the embodiment of FIG. 1 taken along the axis II—II of an exhaust valve.

Referring jointly to FIGS. 1–4, the cylinder block 1 of an engine in accordance with the present invention defines a plurality of cylinders conventionally arranged and terminating, at their upper ends, at a cylinder head 3. The cylinder head 3 defines, for each cylinder, the housing for a controllable delivery or compressed air discharge valve 4 and a controllable hot gas inlet valve 5. Both of valves 4 and 5 open into head 3; i.e., the valves open away from the cylinders.

Figure 4:
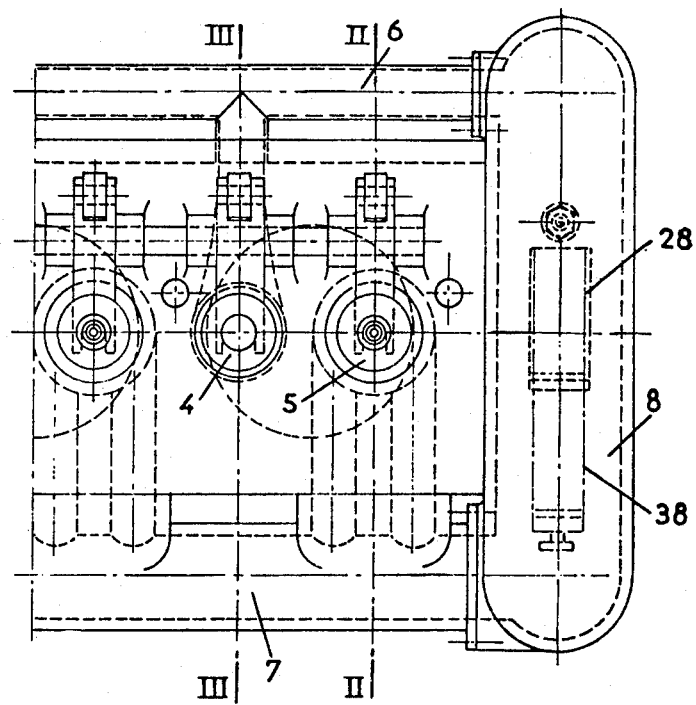
FIG. 4 is a plan view of the first embodiment of the invention with the rocker box cover removed to reveal the camshaft.
Figure 3:
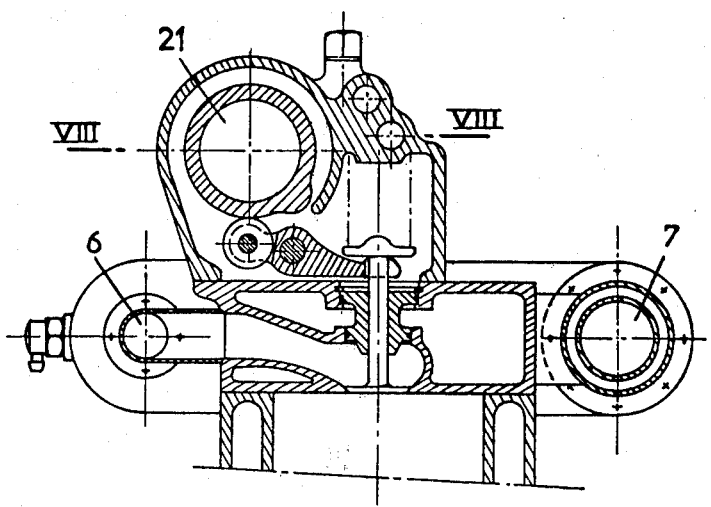
FIG. 3 is a cross-sectional view of the embodiment of FIG. 1 taken along the axis III—III of a compressed gas delivery valve.

The compressed air discharge valves 4 are connected to a delivery manifold 6 in the manner shown in FIGS. 3 and 4. The inlet valves 5 are connected to a hot gas manifold 7 in the manner depicted in FIGS. 2 and 4. The manifolds 6 and 7 are connected to a combustion chamber 8, common to all of the cylinders in a single bank, by means of flanges and gasketing. The relationship of combustion chamber 8 to the remaining engine structure may be seen from a joint consideration of FIGS. 1 and 4.

The hot gas inlet valves 5, which may be most clearly seen from the enlarged view thereof which comprises FIG. 7, are fluid cooled. The circulating coolant is delivered to the valve through a passage 9 in the cylinder head cover and flows downwardly through a tube 10 which is coaxial with the hollow valve stem 12. The circulating coolant thereafter returns to a collector passage 14 through the annular space defined between the tube 10 and hollow stem 12. The collector passage 14 is typically arranged parallelly to the delivery passage 9 and communicates with the hollow valve stem via a further passage 13. During operation, the valve stem 12 reciprocates sliding in an annular seal. The head 5' of the valve is biased against the valve seat by means of the spring 5''.

Referring now to FIGS. 5 and 6, the combustion chamber 8 receives, via the delivery manifold 6, compressed air from the cylinders. The hot gases exit the combustion chamber 8 through the hot gas manifold 7. Combustion chamber 8 is preferably of generally cylindrical shape and is divided into two portions by a partition 15 oriented perpendicularly to the geometrical axis of the chamber.

The introduction of liquid fuel into combustion chamber 8 is accomplished by a fuel injection conduit 16 having a discharge jet 16' positioned at the center of the partition 15 in chamber 8. Compressed air arriving from delivery manifold 6 passes through partition 15 via a pair of openings 17 (FIG. 6) which are positioned symmetrically with respect to jet 16'. Considering FIG. 5, the compressed air is delivered via ports 17 to the interior of a housing 17' in the right hand portion of the combustion chamber. Compressed air exits housing 17' via a pair of oppositely disposed slots 18 which are symmetrical with and parallel to the fuel jet 16'. The slots 18 are designed to be of proper size to insure a sufficient pressure drop to maintain the virtually uniform air flow which mixes with the uniform fuel jet.

Ignition of the fuel-air mixture in combustion chamber 8 is achieved by means of a hot wire 19, a conventional device in diesel engines, positioned adjacent the discharge end of fuel jet 16'. In the manner well known in the art, hot wire 19 will cause initial ignition of the fuel-air mixture when electric current is passed therethrough and combustion will thereafter be maintained by virtue of the fact that wire 19 remains at the fuel-air mixture ignition temperature without external intervention through the combustion mechanism itself. The hot end of combustion chamber 8; i.e., the portion of the chamber to the right of partition 15 in FIG. 5, is cooled by causing a coolant to flow through the double wall 20 thereof.

Referring now to FIGS. 8 and 9, a camshaft 21 is mounted inside the bore of a rocker box cover by means of collars such as collar 23. The camshaft 21 is driven, at the crankshaft speed, via a pulley 24 by means of a toothed belt 24'. The camshaft 21 is affixed to pulley 24 by means of a splined connection which enables shaft 21 to translate axially. In accordance with the invention, the power produced by the engine may be varied by adjusting the opening time of the inlet valves 5. Such variation of the opening of the valves is achieved by translating camshaft 21 and thus the valve control cams 27 (see FIG. 9) with respect to the valve actuators by means of a yoke 26 while shaft 21 continues to rotate on bearing 27'. The cams 27 on shaft 21, which control the operation of inlet valves 5, are of evolute design in order to give the desired variable opening angle dependent upon the longitudinal position of camshaft 21.

In the interest of maintaining pressure within combustion chamber 8, a pressure regulator is employed for controlling the flow of combustible fuel to the chamber independently of the opening time of the inlet valves 5. Referring to FIG. 10, the pressure regulator may comprise a housing or body 28 having a differential area piston 29, 29' disposed in a bore therein. The piston 29, 29' is biased in the upward direction by a spring 30 and the amount of spring bias can be selected by means of an adjustment screw 30'. The pressure regulator is disposed in the fuel feed line and fuel enters housing 28 via an inlet port 42 and exits via a discharge port 43. If the pressure at port 43 of the pressure regulator is lower than the pressure corresponding to the setting of spring 30, the pressure regulator will open thereby permitting the delivery of fuel to the combustion chamber. As soon as the pressure within combustion chamber 8 reaches the pressure corresponding to the spring setting, the fuel flow will be interrupted.

FIG. 12 depicts a simplified control system in accordance with the invention wherein the camshaft 21 does not translate. In accordance with the embodiment of FIG. 12 power output control is accomplished by means of a fuel supply needle valve having a body 38 which defines a tapered cylindrical bore; the needle or valve element 39 being movable within said tapered bore. The position of the tapered needle 30 is controlled by a yoke lever 40 which is loaded into contact with the heel 39' of needle 39 by means of a spring 41. In the case of an automotive application, the position of lever 40 is controlled by the accelerator pedal. A screw 42 limits the displacement of the needle 39 and thus constitutes an idling adjustment.

Regardless of the control mode selected, an engine in accordance with the present invention will employ a variable-delivery fuel pump. The fuel pump should provide substantially constant delivery pressure with zero delivery beyond a certain maximum pressure. The pump depicted in FIG. 11 satisfies these conditions. In FIG. 11, a pump body 31 defines a cylinder within which a piston 32 moves. The pump piston 32 is biased in the delivery direction by means of a spring 33 and the suction stroke is under the control of a rocker 34 operated by a cam 35 on camshaft 21. Fuel enters the pump cylinder via a suction valve 36 and, after compression leaves the cylinder via a delivery valve 37. The combination of the spring and rocker results in a controlled maximum pressure with the flow rate being an inverse function of said pressure.

While preferred embodiments have been shown and described, various modifications and substitutions may be made to the present invention without departing from the spirit and scope thereof. Accordingly, it is to be understood that the present invention has been described by way of illustration and not limitation.

What is claimed is:

1. An external combustion engine comprising
cylinder means, said cylinder means comprising a plurality of individual cylinders each having a piston and exhaust means associated therewith;
a common combustion chamber, said combustion chamber being provided with fuel injection means and including internal means for causing a pressure drop of air delivered thereto to maintain substantially constant mean pressure therein while gas is intermittently delivered thereto and exhaust products are intermittently withdrawn therefrom;
intake valve means associated with each of said cylinders, said intake valve means each including a controlled valve having a valve member and an actuator therefor located externally of the associated cylinder;
means coupling said combustion chamber to all of said cylinders via said intake valve means whereby air compressed in each of said cylinders may be delivered to said combustion chamber upstream of said pressure drop causing means;
exhaust valve means associated with each of said cylinders, said exhaust valve means each including a valve member and an actuator therefor located externally of the associated cylinder;
means for delivering hot exhaust gases from said combustion chamber to said cylinders via said exhaust valves, said exhaust gases being delivered to said cylinders at a pressure which approximates the compressed air delivery pressure; and
means for delivering a coolant for circulation through said exhaust valve means valve members.

2. The apparatus of claim 1 wherein said exhaust valve means each include:
a hollow valve stem, said valve stem being mounted for reciprocating movement relative to the cylinder;
a valve member mounted on said stem for movement therewith;
an apertured valve seat, communication between the interior of the cylinder and said hot gas delivering means being through said seat, said seat cooperating with said valve member to perform an exhaust valving function;
means for biasing said valve member to the closed position;
an actuator for periodically operating said valve to the open position; and
means for coupling said coolant delivering means to the interior of said hollow valve stem.

3. The apparatus of claim 2 wherein said engine further comprises a cylinder head cover and wherein said coupling means comprises:
a tube positioned internally of and coaxial with said valve stem.

4. The apparatus of claim 3 wherein said coolant delivering means comprises:
a delivery passage in said cylinder head cover;
means connecting said delivery passage to said tube;
a return passage in said cylinder head cover; and
means connecting the space between said tube and valve stem inner wall to said return passage.

5. The apparatus of claim 3 wherein said tube is stationary.

6. The apparatus of claim 4 wherein said tube is stationary.

7. The apparatus of claim 5 wherein said valve member is hollow and wherein said tube terminates within said stem at a position to discharge coolant into the interior of said valve member.

8. The apparatus of claim 6 wherein said valve member is hollow and wherein said tube terminates within said stem at a position to discharge coolant into the interior of said valve member.

* * * * *